United States Patent [19]

Matsuzaki

[11] Patent Number: 5,175,634
[45] Date of Patent: Dec. 29, 1992

[54] MULTIPLE STATION FACSIMILE RELAY SYSTEM

[75] Inventor: Akiyuki Matsuzaki, Yokohama, Japan

[73] Assignee: Ricoh Company, Ltd., Tokyo, Japan

[21] Appl. No.: 637,281

[22] Filed: Jan. 3, 1991

[30] Foreign Application Priority Data

Jan. 8, 1990 [JP] Japan .................................. 2-2036

[51] Int. Cl.⁵ ............................................. H04N 1/00
[52] U.S. Cl. .................................. 358/407; 358/434; 358/436; 379/100
[58] Field of Search .............. 358/407, 434, 436, 402; 379/100

[56] References Cited

U.S. PATENT DOCUMENTS 4,954,958  9/1990  Savage et al. ...................... 379/100
4,994,926  2/1991  Gordon et al. ..................... 358/434

FOREIGN PATENT DOCUMENTS 0279045  11/1990  Japan .................................. 358/402

Primary Examiner—Edward L. Coles, Sr.
Assistant Examiner—Thomas L. Stoll
Attorney, Agent, or Firm—Oblon, Spivak, McClelland, Maier & Neustadt

[57] ABSTRACT

A multiple station facsimile relay system for transmitting a message from a transmitting facsimile to a receiving facsimile through relay transmission and for sending an acknowledgment report from a final relay station to the transmitting facsimile through relay transmission. The plurality of relay stations each comprising a memory part for storing a registration table, a control part for storing a message transmit signal and for supplying the stored message transmit signal, a control part for storing a report transmit signal and for supplying the stored report transmit signal, a first signal part for storing a first signal indicative of a code of the transmitting facsimile and for supplying the stored first signal, a second signal part for storing a second signal indicative of a code of the receiving facsimile and for supplying the stored second signal, and a system control part for carrying out a message transmission when a message transmit signal is received and for carrying out a report transmission when a report transmit signal is received.

8 Claims, 3 Drawing Sheets

FIG. 3(A)

| NO. | CONTENT |
|---|---|
| 1 | RLY : —<br>RCV : FX1 |
| 2 | RLY : —<br>RCV : FX2 |
| 3 | RLY : FT2<br>RCV : *3 |
| 4 | RLY : FT2<br>RCV : *4 |
| 5 | RLY : FT2<br>RCV : *5 |
| 6 | RLY : FT2<br>RCV : *6 |

| NO. | CONTENT |
|---|---|
| 1 | RLY : FT1<br>RCV : *1 |
| 2 | RLY : FT1<br>RCV : *2 |
| 3 | RLY : —<br>RCV : FX3 |
| 4 | RLY : —<br>RCV : FX4 |
| 5 | RLY : FT3<br>RCV : *5 |
| 6 | RLY : FT3<br>RCV : *6 |

| NO. | CONTENT |
|---|---|
| 1 | RLY : FT2<br>RCV : *1 |
| 2 | RLY : FT2<br>RCV : *2 |
| 3 | RLY : FT2<br>RCV : *3 |
| 4 | RLY : FT2<br>RCV : *4 |
| 5 | RLY : —<br>RCV : FX5 |
| 6 | RLY : —<br>RCV : FX6 |

20c

MULTIPLE STATION FACSIMILE RELAY SYSTEM

BACKGROUND OF THE INVENTION

The present invention generally relates to a multiple station facsimile relay system, and more particularly to a multiple station facsimile relay system in which a material to be transmitted is sent from a transmitting facsimile to a receiving facsimile through relay transmission and an acknowledgment report confirming transmission of the message to the receiving facsimile is returned back to the transmitting facsimile through relay transmission.

Recently, several types of communication networks have been developed, and an increasing number of types of the communication networks is being made commercially available. However, in many cases where a facsimile communication is carried out by utilizing such communication networks, it is necessary to make use of several different communication networks for transmitting a message or image for a transmitting facsimile to a receiving facsimile via a plurality of relay stations. Generally, a communication network to which the transmitting facsimile is connected directly is different from a communication network to which the receiving facsimile is connected directly, and, in such a case, a direct transmission of the message or image from the transmitting facsimile to the receiving facsimile cannot be made without performing a relay transmission thereof via other relay station facsimiles. To carry out the above relay transmission, the relay station facsimiles used as relay stations through which the message or image is transmitted to the receiving facsimile must include a facsimile already connected to the communication network to which the transmitting facsimile is connected and a facsimile already connected to the communication network to which the receiving facsimile is connected. Conventionally, a transmitting facsimile which makes a request for relay transmission to any relay station (which transmitting facsimile is, hereinafter, called merely a transmitting station) transfers or notifies to the relay station a registered code of the transmitting station facsimile when a request for the relay transmission is made by the transmitting station to the relay station. This notification of a registered code of the transmitting station facsimile to the relay station is necessary for each relay station for sending an acknowledgment report back to each transmitting station facsimile each time a relay transmission of the message or image from one station to another is completed.

In such a conventional facsimile relay transmission method, the transmitting station merely notifies to the relay station a registered code of the transmitting station facsimile for receiving an acknowledgment report from a final relay station. If there is only one relay station which is currently in use for relay transmission, an acknowledgment report can be safely sent back to the transmitting station from the only relay station. However, if two or more relay stations are used for the relay transmission, a common communication network which is shared by both the transmitting station and a final relay station does not necessarily exist, and there is usually no suitable means for determining a path for sending a report from the final relay station to the transmitting station. Therefore, it is very difficult to send safely an acknowledgment report from the final station back to the transmitting station after the relay transmission of the message or image is completed. Conventionally, in such cases where a plurality of relay stations are used for relay transmission, an acknowledgment report often cannot be safely sent back to a transmitting facsimile from a final relay station.

SUMMARY OF THE INVENTION

Accordingly, it is a general object of the present invention to provide an improved multiple station facsimile relay system in which the above described problems are eliminated.

Another and more specific object of the present invention is to provide a multiple station facsimile relay system which comprises a transmitting facsimile from which a message is transmitted and to which an acknowledgment report is sent back, a receiving facsimile which receives the message from the transmitting facsimile through relay transmission, and a plurality of relay stations including a first relay station and a final relay station, the plurality of relay stations each comprising a memory part for storing a registration table which defines a relay item and a receiving item for every facsimile number among a set of registered facsimile numbers of a plurality of facsimiles, a control part for storing a message transmit signal from a preceding relay station or the transmitting facsimile and for supplying the stored message transmit signal which instructs a relay transmission of the message of a following relay station or the receiving station facsimile, a control part for storing a report transmit signal from a following relay station or the final relay station and for supplying the stored report transmit signal which instructs a report transmission of the report of a preceding relay station, a first signal part for storing a first signal indicative of a code of the transmitting facsimile and for supplying the stored first signal to a following relay station, a second signal part for storing a second signal indicative of a code of the receiving facsimile and for supplying the stored second signal to a preceding relay station, and a system control part for carrying out a message transmission when a message transmit signal is received and for carrying out a report transmission when a report transmit signal is received, the transmitting facsimile sending the first signal to the first signal part of the first relay station as well as sending the second signal to the second signal part thereof when a message transmit signal is transmitted to the system control part of the first relay station, each the relay station calling the following relay station to which the message is next transmitted, the following relay station being specified by a relay item for a facsimile number, indicated by the second signal, within the registration table of each the relay station, for transmitting the message to the final relay station through the relay stations and at the same time the first signal and the second signal being transmitted to the final relay station through the relay stations, the final relay station transmitting the message to the receiving facsimile, then calling the preceding relay station to which the acknowledgment report is sent back, the preceding relay station being specified by a relay item for a facsimile number, indicated by the first signal, within the registration table of each the relay station, for sending the acknowledgment report back to the preceding relay station and at the same time the first signal being transmitted to the preceding relay station, each the relay station calling the preceding relay station for sending the acknowledgment report back to the transmitting facsimile through the relay stations, the preceding relay station being specified by a relay item for a facsimile number, indicated by the first signal, within the registration table of each the relay station. According to the present invention, each destination station for relay transmission of a message is designated with the destination station registration table specifying registered codes of a receiving facsimile and relay stations. And, a signal indicative of a registered code of the transmitting facsimile which should receive an acknowledgment report from a final relay station is transferred to each relay station, and such registered code of a receiving station corresponds to the counterpart in the destination station registration table. Therefore, it is possible for the final relay station to transmit safely an acknowledgment report back to the transmitting station and for the transmitting station to receive safely the acknowledgment report from the final relay station. Hence, the present invention can provide good applicability and convenience of the facsimile communication system when a multiple station facsimile relay transmission is carried out.

Other objects and further features of the present invention will become apparent from the following detailed description when read in conjunction with the accompanying drawings.

BRIEF DESCRIPTION OF THE DRAWINGS

FIGS. 3A, 3B and 3C are diagrams for explaining the contents of destination station registration tables 20a, 20b and 20c, respectively, which are each stored in a hard disk memory provided within a relay station facsimile.

DESCRIPTION OF THE PREFERRED EMBODIMENTS

Figure 1:
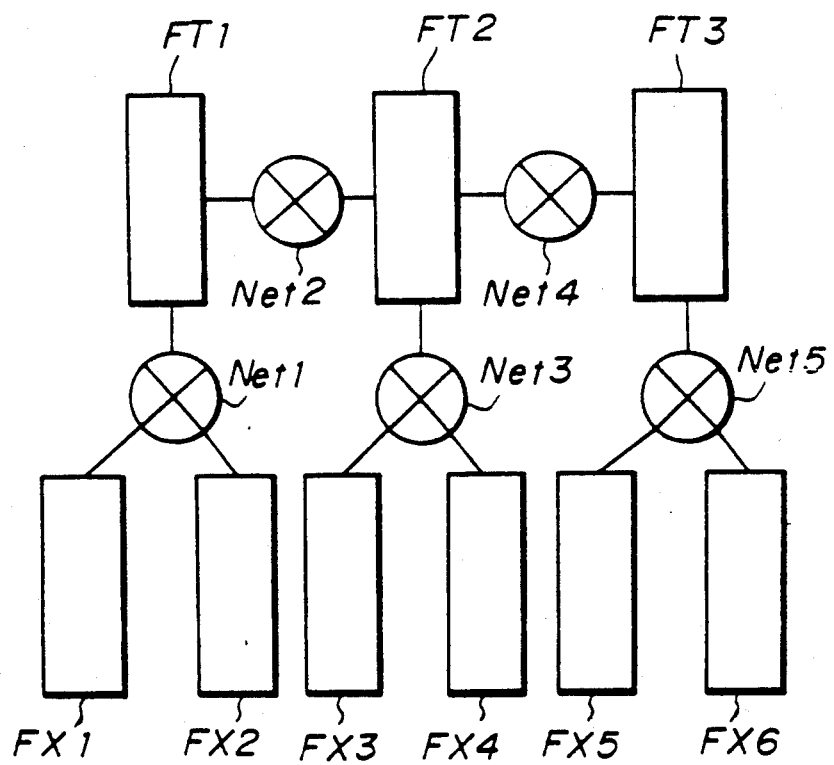
FIG. 1 is a diagram showing a facsimile communication system to which a multiple station facsimile relay system according to the present invention may be applied.

First, a description will be given of an embodiment of a multiple station facsimile relay system according to the present invention, with reference to FIGS. 1 through 3. FIG. 1 shows an example of a facsimile system to which the present invention may be applied. In FIG. 1, there are five different communication networks NET1 through NET5 which are each connected directly to a few facsimiles. For example, two facsimiles FX1 and FX2 are connected directly to the network NET1, and a facsimile FT1 that is used as a relay station is connected directly to this network NET1. The facsimile FT1 as a relay station is also connected directly to the network NET2. To this network NET2, a facsimile FT2 that is used as a relay station is also connected directly. This facsimile FT2 as a relay station is also connected directly to the network NET3 and to the network NET4, and facsimiles FX3 and FX4 are connected indirectly to the relay station FT2 via the network NET3. To the network NET4, a facsimile FT3 that is used as a relay station is also connected directly. This relay station FT3 is also connected directly to the network NET5, and facsimiles FX5 and FX6 are connected indirectly to the relay station FT3 via the network NET5. These five communication networks NET1 through NET5 are usually different form each other, and they may be, for example, a subscriber telephone line network, a local area network (LAN), a leased line network, a DDX circuit switching (DDX-CS) network, a DDX packet switching (DDX-PS) network and the like.

Next, a description will be given of the relay station facsimiles FT1 through FT3 which are used as the relay station through which a relay transmission of a message is made from a transmitting station to a receiving station. FIG. 2 shows the construction of a relay station facsimile according to the present invention. This relay station facsimile generally has a system control part 1, a memory (for example, a random access memory RAM) 2, an image processor 3, a scanner control part 4, a scanner 5, a plotter control part 6, a plotter 7, a hard disk control part 8, a hard disk 9, a communication control part 10, a modem 11, a terminal part 12, an operating part 13, a communication control part 14 and a terminal 15.

The system control part 1 controls sequences of system operations of both a facsimile system and a relay system in accordance with a system control program already stored in an internal read only memory (ROM) which is provided within the system control part 1. And, the system control part 1 also carries out a relay transmission processing and an acknowledgment report sending processing according to the present invention. The memory 2 has a memory storage which is used as a work area in which several data required for the processings and operations of each of the relay station facsimiles FT1 through FT3 are stored, such several data including, especially, a facsimile number of a destination station, which a relay transmission of a message from a transmitting station is directed to, and a facsimile number of a receiving station (or, a transmitting station), which an acknowledgment report is sent from a final relay station back to. The image processor 3 carries out a half tone processing and a scaling processing of image information inputted. The scanner 5 reads image information from an original document by making a main scan over the original document along a main scan line and by making a sub scan along a sub scan line in conjunction with each main scan, and the scanner 5 outputs an image signal based on the image information being read. The plotter 7 records and outputs an image information received from an external terminal or an image formation of an original document read by the scanner 5, onto a record sheet.

The hard disk control part 8 controls driving and operations of the hard disk 9, and this hard disk control part 8 is used to encode image information into a coded data in accordance with a prescribed coding method, and to decode a coded data into a plain image data. The hard disk 8 has a given storage capacity in which a certain volume of coded image data, equivalent to a number of pages, can be stored. And, in the hard disk 9 of each of the relay station facsimiles FT1 through FT3, a destination station registration table which contains numbers or codes of destination station facsimiles is stored. For example, FIG. 3A shows a destination station registration table 20a which is stored in the hard disk 9 with respect to the relay station facsimile FT1, FIG. 3B shows a destination station registration table 20b stored in the hard disk 9 with respect to the relay station facsimile FT2, and FIG. 3C shows a destination station registration table 20c stored in the hard disk 9 with respect to the relay station facsimile FT3. Each of these destination station registration tables 20a, 20b, 20c includes a first column, indicated by "NO." in FIGS. 3A through 3C, and a second column, indicated by "CONTENT" in FIGS. 3A through 3C. In the first column "NO.", registered codes of destination station registration tables are listed, and, in the second column "CONTENT", there are two items listed for each registered number of destination station registration tables, or, a "relay station" item, indicated by "RLY" in FIGS. 3A through 3C, and a "receiving station" item, indicated by "RCV" in FIGS. 3A through 3C. This relay station item "RLY" contains a registered code of a next relay station facsimile (indicated by "FT1", "FT2" and so on in FIGS. 3A through 3C) when a receiving relay station receiving a message from a transmitting station is not connected to a network to which the transmitting station is connected directly. And, when the above receiving relay station is connected directly to the above network, the relay station item "RLY" contains no registered code. The receiving station item "RCV" in the "CONTENT" column contains a registered code of a receiving relay station facsimile (indicated by "FX1", "FX6" and so on in FIGS. 3A through 3C) when the receiving relay station facsimile receiving a message from a transmitting station is connected to a network to which the transmitting station facsimile is connected directly, And, when the above receiving relay station facsimile is not connected to the above network, the receiving station item "RCV" contains a registered number (indicated by "*1", "*6" and so on in FIGS. 3A through 3C) of a destination station registration table (for example, table 20a, 20b or 20c) to which reference should be made for relay transmission of the message to that receiving relay station facsimile.

The communication control part 10 can be connected to a communication circuit, which may be, for example, a telephone line, via the terminal part 12. When the communication control part 10 is connected to a telephone line via the terminal part 12 so that the present relay station is connected to a communication network, the communication control part 10 carries out a prescribed G3 facsimile communication procedure. And, the communication control part 10 having a built-in function to control a network communication processing can control a circuit switching procedure for a communication circuit via the terminal part 12. The modem 11 having an interface with the communication control part 10 performs both a modulation of a transmitting signal to an external system and a demodulation of a signal received from an external system.

The operating part 13 comprises a keyboard control part 13a, a keyboard 13b, a liquid crystal display (LCD) control part 13c and a liquid crystal display (LCD) 13d. Several kinds of commands, instructions or other information are inputted from the keyboard 13b to the multiple station facsimile relay system. These commands and other data include, for example, registered numbers and codes related to the destination station registration tables according to the present invention. And, several kinds of commands inputted from the keyboard 13b and other in-process information from the relay station facsimiles FT1 to FT3 to an operator at the multiple station facsimile relay system are displayed on the LCD display 13d.

The communication control part 14 can be connected to a communication circuit which may be, for example, a digital communication circuit, via the terminal 15, and the communication control part 14 carries out a communication procedure appropriate for the communication circuit being connected thereto which is for example a prescribed G4 facsimile communication procedure for controlling a circuit switching, packet switching or the others.

Figure 2:
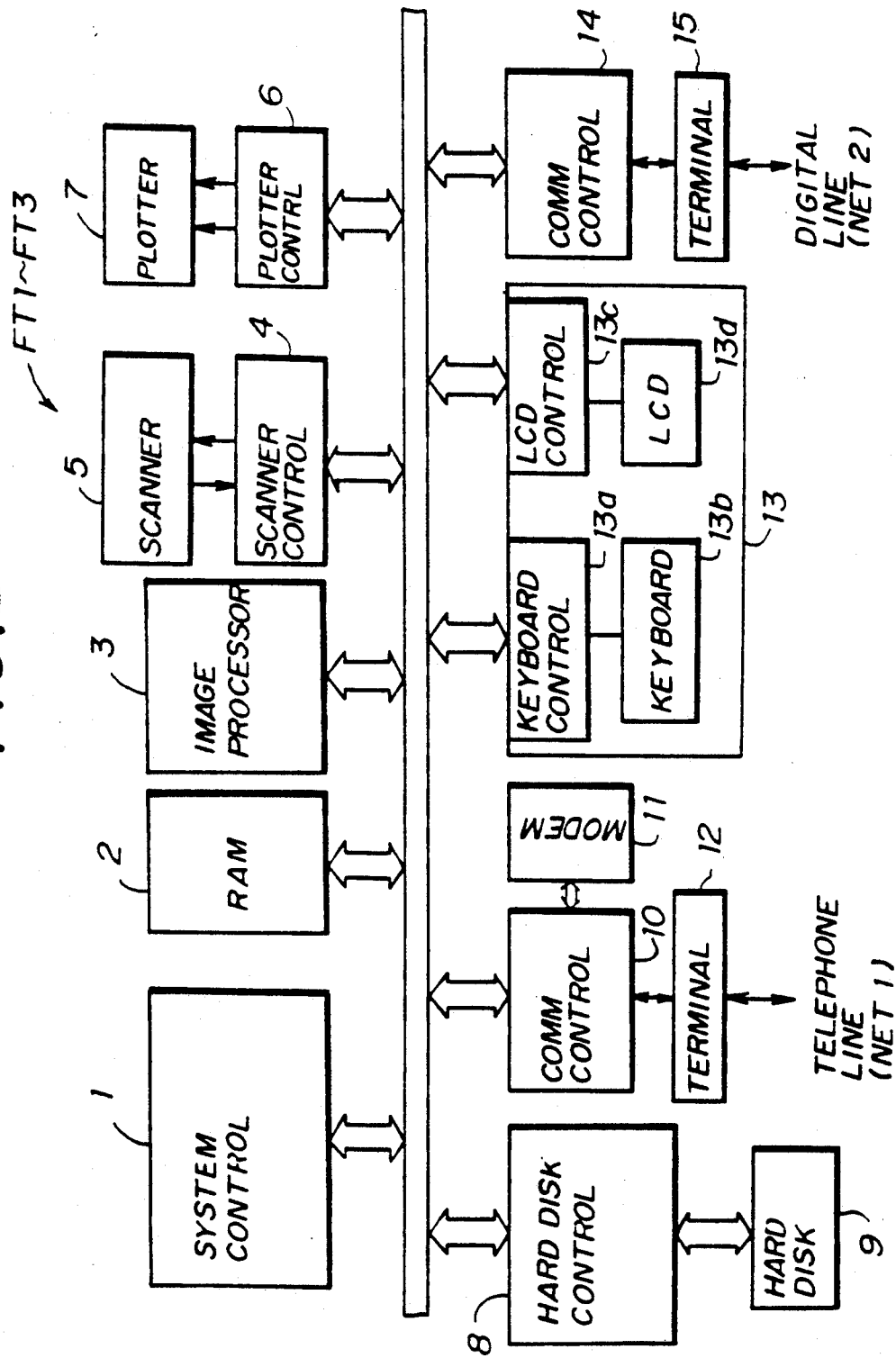
FIG. 2 is a block diagram showing an embodiment of a multiple station facsimile relay system according to the present invention.

Obviously, the facsimiles FX1 through FX6 shown in FIG. 1 are not limited only to a facsimile system which has the same construction as that of the above described relay station facsimiles FT1 through FT3 as shown in FIG. 2. A hard disk control part 8 and a hard disk 9 are not required for a facsimile system which is not practically used as a relay station facsimile. And, in a case of a facsimile system which is connected to only one communication circuit, the provision of only one communication control part may be adequate for such a facsimile system.

Next, a description will be given of the function of a multiple station facsimile relay system according to the present invention when a message or image is transmitted from a transmitting facsimile FX1 to a receiving facsimile FX6 through a plurality of relay station facsimiles. Since the transmitting facsimile FX1 is connected to the network NET1 but the receiving facsimile FX6 is not connected directly to the network NET1, as shown in FIG. 1, the transmitting facsimile FX1 first makes a request for transmission of the message to the relay station facsimile FT1 which is connected directly to the network NET1. That is, an operator at the transmitting facsimile FX1 calls the relay station facsimile FT1 for making a request for relay transmission of the message to the receiving facsimile FX6 via the relay station facsimiles. At the same time, a first signal indicative of a registered code ("*6") of the receiving facsimile FX6 as a destination station for receiving the message transmitted by the facsimile FX1 and a second signal indicative of a registered code ("*1") of the transmitting facsimile FX1 as a receiving station for receiving the acknowledgment report sent back from the facsimile FX6 are transmitted from the transmitting facsimile FX1 to the relay station facsimile FT1 via the network NET1. The first signal and the second signal indicative of the registered codes "*6" and "*1", respectively, denote the codes registered in the relay station item or the receiving station item in the corresponding number row of the destination station registration table stored in the memory 9 of the relay station facsimile, and these signals are included in a facsimile control signal (for example, a NSS signal), and this facsimile control signal with the above first and second signals included is transmitted to the relay station facsimile FT1.

The relay station facsimile FT1, which has received the request for relay transmission of the message from the facsimile FX1 together with the first signal and the second signal from the facsimile FX1, retrieves the destination station registration table 20a, based on the registered code "*6" indicated by the first signal and the registered code "*1" indicated by the second signal. Because there are a registered code "*6" in the receiving station item "RCV" and a registered code "FT2" in the relay station item "RLY" within the content column "CONTENT" corresponding to the number row "NO.6" of the destination station registration table 20a, as shown in FIG. 3A, the relay station facsimile FT1 makes a determination that the receiving station FX6 is not connected directly to the network NET1 to which the transmitting station FX1 is connected directly. The relay station facsimile FT1 therefore calls a next relay station FT2 which corresponds to the code being registered in the relay station item "RLY" within the content column "CONTENT" of the number row "NO.6" in the table 20a, for making a request for relay transmission of the message to the relay station FT2, together with the first signal indicative of the registered code "*6" of a destination station facsimile and the second signal indicative of the registered code "*1" of a receiving station facsimile.

Similarly, the relay station facsimile FT2, which has received the request for relay transmission from the preceding relay station facsimile FT2 together with the first signal and the second signal from the facsimile FX1, retrieves the destination station registration table 20b, based on the registered code "*6" of the destination station indicated by the first signal. Then, the relay station facsimile FT2 calls the following relay station FT3 for making a request for relay transmission of the message to the facsimile FX6 through the relay station FT3 and for transferring the first signal and the second signal to the facsimile FX6 at the same time. As shown in FIG. 1, the relay station facsimile FT3 is connected directly to the network NET5 to which the destination station facsimile FX6 is connected. Also, the final relay station facsimile FT3, which has received the request for the relay transmission from the preceding relay station FT2, retrieves the destination station registration table 20c based on the registered code "*6" of the destination station indicated by the first signal received. Then, the final relay station facsimile FT3 makes a determination that the destination station facsimile FX6 is connected to the network NET5 to which this final relay station facsimile FT3 is connected directly because there is no registered code in the relay station item "RLY" of the number row "NO.6" of the table 20c and there is a registered code "FX6" in the receiving station item "RCV" thereof and this registered code "FX6" is a code that is not preceded by asterisk "*". Therefore, the final relay station facsimile FT3 calls the destination station facsimile FX6 for transmitting the message from the facsimile FT3 to the facsimile FX6.

After the transmission of the message to the destination station FX6 is completed, the final relay station FT3 starts sending back an acknowledgment report to the transmitting station FX1 (which receives the acknowledgment report from the facsimile FX6) via the preceding relay stations FT1 and FT2. The final relay station FT3 retrieves the destination station registration table 20c by the registered code "*1" of the receiving station to make a determination as to which relay station must be called for sending the acknowledgment report back to the transmitting station FX1. Once such relay station is found out, the final relay station FT3 calls the relay station FT2, which corresponds to the code registered in the relay station item "RLY" within the content column "CONTENT" in the number row "NO.1" of the table 20c, so that the final relay station FT3 makes a request for relay transmission of the acknowledgment report from the relay station FT3 to the relay station FT2. At the same time, the final relay station F3 transfers the second signal indicative of the registered code "*1" of the transmitting facsimile FX1 as a receiving station for receiving the acknowledgment report from the final station FT3.

The relay station FT2, which has received the acknowledgment report as well as the second signal indicative of the registered code "*1" of the transmitting station from the relay station FT3, retrieves the destination station registration table 20b in a similar manner to find out the relay station FT1, and transfers the acknowledgment report as well as the second signal to the relay station FT1. And, the relay station FT1, after receiving the acknowledgment report and the second signal indicative of the registered code "*1", retrieves the destination station registration table 20a in a similar manner to recognize the receiving station facsimile FX1 being connected to the network NET1 to which the facsimile FT1 is connected directly. Finally, the relay station FT1 transmits the acknowledgment report safely to the original transmitting station FX1, based on the information in the destination station registration table 20a.

In the above embodiment, a case in which a multiple station facsimile relay transmission is carried out through three relay stations only is described, but, obviously, the present invention is not limited to this embodiment.

As described above, each of the relay stations has a memory for storing a destination station registration table (20a, 20b, 20c), and a signal indicative of a registered code of the transmitting station as a receiving station for receiving the acknowledgment report from the destination station is transmitted to each of the relay stations. Therefore, when a multiple station facsimile relay transmission is performed, the acknowledgment report can be safely sent back to the transmitting station, based on the destination station registration table by means of the second signal indicative of a registered code of the transmitting station. Consequently, the present invention can provide a better applicability and convenience of the facsimile communication system when a multiple station facsimile relay transmission is carried out.

Further, the present invention is not limited to the above described embodiment, and variations and modifications may be made without departing from the scope of the present invention.

What is claimed is:

1. A multiple station facsimile relay system comprising:
   a transmitting facsimile from which a message is transmitted and to which an acknowledgment report is sent back;
   a receiving facsimile which receives the message from the transmitting facsimile through relay transmission; and
   a plurality of relay stations including a first relay station and a final relay station, the plurality of relay stations each comprising: memory means for storing a registration table which defines a relay item and a receiving item for every facsimile number among a set of registered facsimile numbers of a plurality of facsimiles; means for storing a message transmit signal from a preceding relay station or the transmitting facsimile and for supplying the stored message transmit signal which instructs a relay transmission of the message of a following relay station or the receiving station facsimile; means for storing a report transmit signal from a following relay station or the final relay station and for supplying the stored report transmit signal which instructs a report transmission of the report of a preceding relay station; first signal means for storing a first signal indicative of a code of the transmitting facsimile and for supplying the stored first signal to a following relay station; second signal means for storing a second signal indicative of a code of the receiving facsimile and for supplying the stored second signal to a preceding relay station; and system control means for carrying out a message transmission when a message transmit signal is received and for carrying out a report transmission when a report transmit signal is received, wherein said transmitting facsimile sends the first signal to the first signal means of the first relay station as well as sends the second signal to the second signal means thereof when a message transmit signal is transmitted to the system control means of the first relay station, each said relay station calling the following relay station to which the message is next transmitted, the following relay station being specified by a relay item for a facsimile number, indicated by the second signal, within the registration table of each said relay station, for transmitting the message to the final relay station through said relay stations and at the same time the first signal and the second signal being transmitted to the final relay station through said relay stations.

2. The system as claimed in claim 1, wherein said final relay station transmits the message to the receiving facsimile then calls the preceding relay station to which the acknowledgment report is sent back, the preceding relay station being specified by a relay item for a facsimile number, indicated by the first signal, within the registration table of each said relay station, for sending the acknowledgment report back to said preceding relay station and at the same time the first signal being transmitted to said preceding relay station, each said relay station calling the preceding relay station for sending the acknowledgment report back to the transmitting facsimile through said relay stations, said preceding relay station being specified by a relay item for a facsimile number, indicated by the first signal, within the registration table of each said relay station.

3. The system as claimed in claim 2, wherein a preceding relay station which is next called by each said relay station for sending the acknowledgment report back to the transmitting facsimile is determined with a relay item in a facsimile number row, corresponding to the transmitting facsimile, within the registration table stored in the memory means of each said relay system.

4. The system as claimed in claim 2, wherein a following relay station which is next called by each said relay station for transmitting the message to the receiving facsimile is determined with a relay item in a facsimile number row, corresponding to the receiving facsimile, within the registration table stored in the memory means of each said relay station.

5. The system as claimed in claim 2, wherein the final relay station, when there is a code other than a facsimile number preceded by asterisk in a receiving item for a facsimile number row corresponding to the receiving facsimile within the registration table of the final relay station, makes a determination that a relay transmission of a message from the transmitting facsimile to the receiving facsimile is completed.

6. The system as claimed in claim 2, wherein the first relay station, when there is a code other than a facsimile number preceded by asterisk in a receiving item for a facsimile number preceded by asterisk in a receiving item for a facsimile number row corresponding to the transmitting facsimile within the registration table of the first relay station, makes a determination that a relay transmission of an acknowledgment report from the final relay station to the transmitting facsimile is completed.

7. The system as claimed in claim 2, wherein a network to which said transmitting facsimile is connected directly is different from a network to which said receiving facsimile is connected directly.

8. The system as claimed in claim 1, wherein said transmitting facsimile and said receiving facsimile are arbitrarily selectable from among said plurality of facsimiles.

* * * * *